(12) United States Patent
Enomoto et al.

(10) Patent No.: US 9,385,581 B2
(45) Date of Patent: Jul. 5, 2016

(54) MAGNETIC GEAR MECHANISM

(75) Inventors: Yuji Enomoto, Hitachi (JP); Junnosuke Nakatsugawa, Hitachi (JP); Norihisa Iwasaki, Hitachinaka (JP); Masashi Kitamura, Mito (JP)

(73) Assignee: Hitachi, Ltd., Tokyo (JP)

( * ) Notice: Subject to any disclaimer, the term of this patent is extended or adjusted under 35 U.S.C. 154(b) by 157 days.

(21) Appl. No.: 13/980,516

(22) PCT Filed: Feb. 21, 2011

(86) PCT No.: PCT/JP2011/000933
§ 371 (c)(1),
(2), (4) Date: Jul. 18, 2013

(87) PCT Pub. No.: WO2012/114368
PCT Pub. Date: Aug. 30, 2012

(65) Prior Publication Data
US 2013/0320795 A1 Dec. 5, 2013

(51) Int. Cl.
H02K 49/10 (2006.01)

(52) U.S. Cl.
CPC .............. *H02K 49/10* (2013.01); *H02K 49/106* (2013.01)

(58) Field of Classification Search
CPC .................. H02K 49/00–49/12; H02K 16/02; H02K 49/106; H02K 49/108
USPC ........................... 310/103, 104, 112, 114, 266
See application file for complete search history.

(56) References Cited

U.S. PATENT DOCUMENTS 3,943,391 A * 3/1976 Fehr .............................. 310/103
4,396,849 A 8/1983 Taiani (Continued)

FOREIGN PATENT DOCUMENTS

| GB | 2 457 682 A | 8/2009 |
| JP | 2001-54277 A | 2/2001 |

(Continued)

OTHER PUBLICATIONS

Machine Translation, Shimizu et al., JP 2009168101 A, Jul. 30, 2009.*

(Continued)

*Primary Examiner* — Thomas Truong
(74) *Attorney, Agent, or Firm* — Crowell & Moring LLP

(57) ABSTRACT

The present invention is intended to provide a magnetic gear structure that realizes a magnetic gear that transmits a torque efficiently by reducing eddy currents generated in the interior of magnets. In order to solve the subject described above, in the magnetic gear structure, a structure in which magnets are arranged in the interior of an iron core in an inner rotor portion. Bonded magnets formed by molding, for example, NdFeB powder may be used as the magnets. Since the influence of the eddy current on the side of an outer rotor having a larger pole number is large, a structure in which the magnets are arranged in the interior only of an outer rotor portion having a larger pole number is also applicable. In addition, the magnets to be embedded may be divided into a plurality of pieces. The finer the division of the magnets, the less eddy currents are generated, so that a method of further fining down and assembling the same is also effective. Further reduction of the eddy currents is possible by laminating the plate-shaped magnets having a thickness equivalent to an electromagnetic steel plate in the axial direction.

2 Claims, 6 Drawing Sheets

(56) References Cited

U.S. PATENT DOCUMENTS

| | | | |
|---|---|---|---|
| 7,508,104 B2 * | 3/2009 | Schmidt et al. | 310/104 |
| 2001/0024068 A1 * | 9/2001 | Aizawa et al. | 310/43 |
| 2008/0211335 A1 * | 9/2008 | Abe et al. | 310/103 |
| 2011/0012458 A1 * | 1/2011 | Atallah et al. | 310/103 |

FOREIGN PATENT DOCUMENTS

| | | | | |
|---|---|---|---|---|
| JP | 2007-116885 A | 5/2007 | | |
| JP | 2009-168101 A | 7/2009 | | |
| WO | WO 2009087408 A2 * | 7/2009 | | H02K 49/10 |
| WO | WO 2009/103993 A1 | 8/2009 | | |

OTHER PUBLICATIONS

Corresponding International Search Report with English Translation dated May 17, 2011 (nine (9) pages).

T. Ikeda et al., "A Way to Improve Efficiency of Permanent-Magnet Magnetic Gears", Journal of Magnetics Society of Japan, 2009, vol. 33, No. 2, pp. 130-134.

T. Ikeda et al., "Consideration of Rotor Structure in Permanent-Magnet Magnetic Gears", Journal of the Magnetics Society of Japan, 2010, vol. 34, No. 3, pp. 380-384.

English translation of Japanese Office Action dated Nov. 26, 2013 (three (3) pages).

Chinese Office Action dated Apr. 27, 2015 (one (1) page).

* cited by examiner

MAGNETIC GEAR MECHANISM

TECHNICAL FIELD

The present invention relates to a magnetic gear mechanism configured to transmit a torque without contact.

BACKGROUND ART

Motors or power engines are used as a power driving source in industrial apparatuses, household electrical appliances, automotive vehicles, railways, and the like. In such power machines, an output torque and the number of revolutions of the motor or the power engine are reduced by a mechanical gear and are converted to a required torque and number of revolutions when using in many cases. However, when a high-speed electric machine is used together with a mechanical gear box, a high system-torque density may be realized. However, there arise necessities of lubrication and cooling. In addition, reliability is also an important problem. Magnetic gear mechanisms studied by aiming the problems described above are disclosed also in Non Patent Literature 1 and in Non Patent Literature 2. This magnetic gear mechanism causes less abrasion and loss due to heat generation in comparison with mechanical gear mechanisms, and is capable of transmitting a relatively high torque.

CITATION LIST

Non Patent Literature

NPL 1: Journal of the Magnetics society of Japan Vol. 33, No. 2, 2009, "A way to Improve Efficiency of Permanent-Magnet Magnetic Gears"

NPL 2: Journal of the Magnetics society of Japan Vol. 34, No. 3, 2010, "Consideration of Rotor Structure in Permanent-Magnet Magnetic Gears"

SUMMARY OF INVENTION

Technical Problem

However, although a configuration of a magnetic gear mechanism in which a permanent magnet is divided in a direction of thickness of lamination is disclosed in NPL1 described above, values are only calculated values, and there still remains a problem that an eddy current is generated on each of the divided pieces of the magnet, generates a loss, and causes heat generation.

NPL 2 described above discloses a configuration in which an embedded magnet type is employed as a structure of a rotor of the magnetic gear mechanism. However, this structure is an example for preventing a torque transmitting force from lowering with respect to a surface magnet type, and is not a structure specifically aiming at a countermeasure for the eddy current to significantly reduce the loss, and there is a problem that the problem of generation of the eddy current on the surfaces of the magnets near gaps remains.

Accordingly, it is an object of the present invention to realize a magnetic gear mechanism capable of transmitting a torque efficiently.

Solution to Problem

In order to solve the above-described problem, in a magnetic gear mechanism including two rotors each including permanent magnets having a plurality of poles; and pole shoe members formed of a soft magnetic material, having a plurality of poles, and arranged between the rotors, wherein rotation is transmitted by modulating magnetic fluxes each having a ratio of magnet pole numbers by pole shoes thereof, a configuration in which the rotors each are formed of a laminated member of a soft magnetic material, the permanent magnets are arranged in the interior of the soft magnetic material, the permanent magnets of the rotor are arranged so as to be exposed to a surface facing the pole shoe members that modulate the magnetic fluxes, and are divided into a plurality of pieces in the axial direction may be employed.

Advantageous Effects of Invention

According to the present invention, a magnetic gear mechanism configured to transmit a torque efficiently may be realized.

DESCRIPTION OF EMBODIMENTS

Referring to drawings, examples of the present invention will be described below.

EXAMPLE 1

Figure 1:
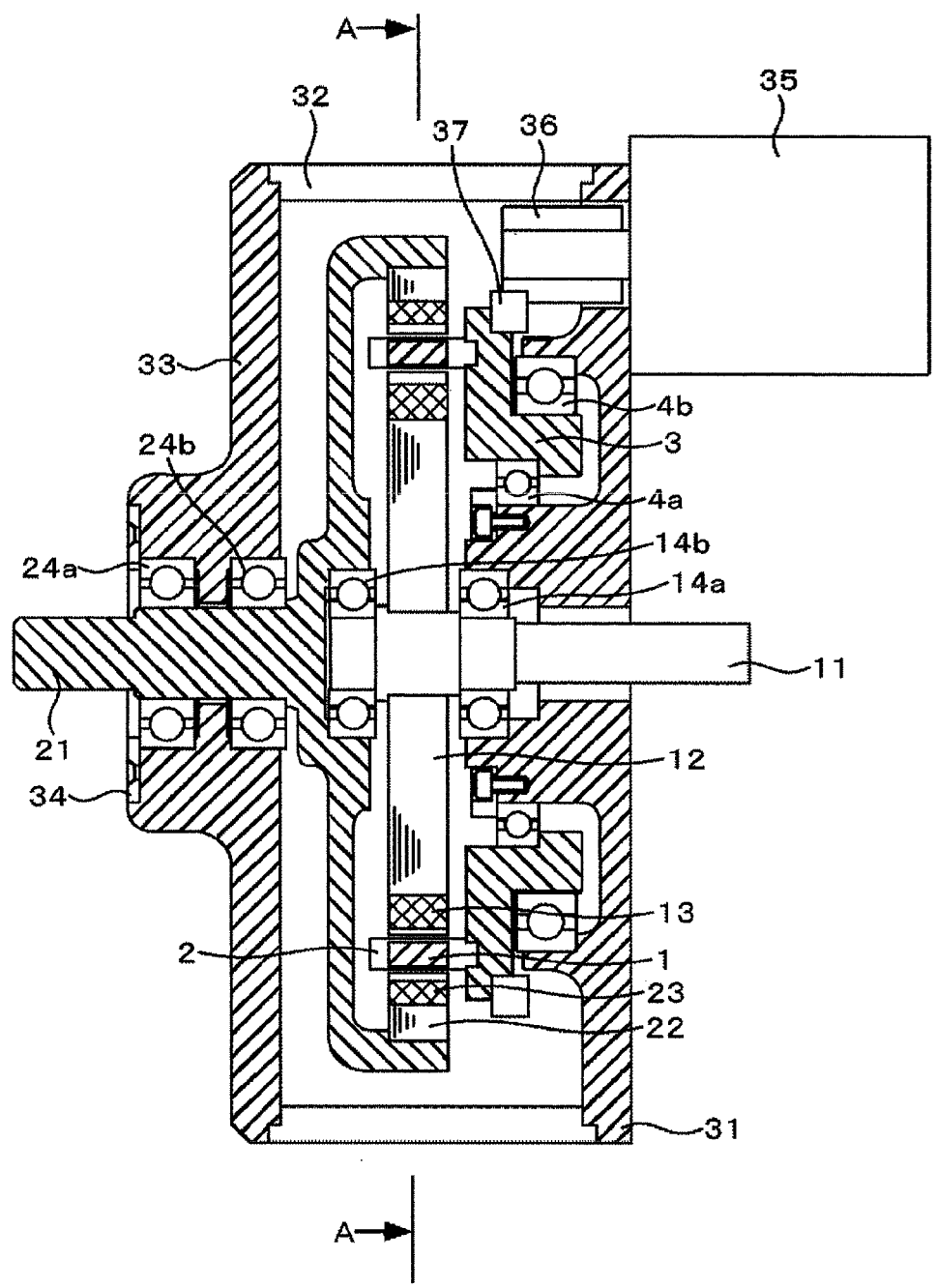
FIG. 1 is a lateral cross-sectional view of a magnetic gear mechanism according to a first example of the present invention.
Figure 2:
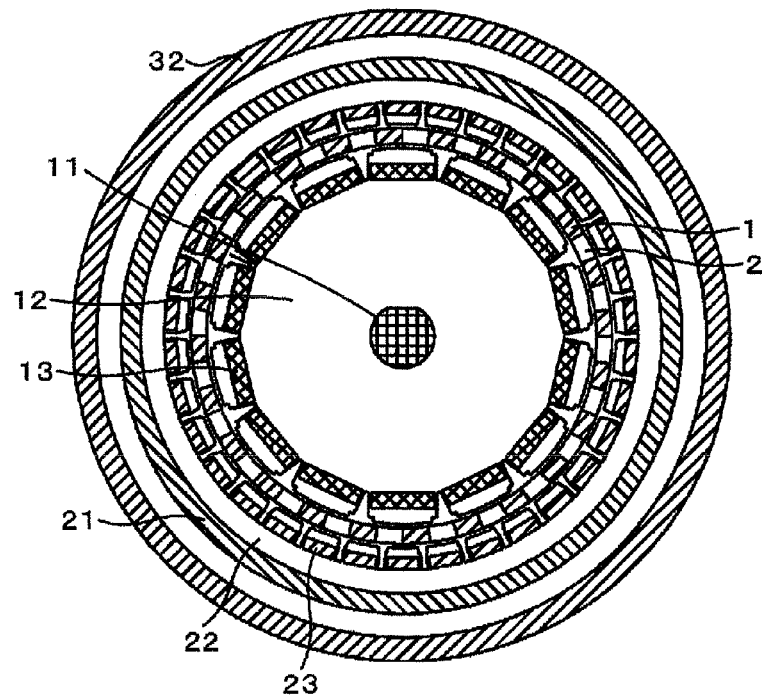
FIG. 2 is a drawing illustrating a cross-sectional structure of an axial center portion of a rotor iron core of the magnetic gear mechanism according to the first example of the present invention.

Referring now to FIG. 1 and FIG. 2, a first example of the present invention will be described below.

FIG. 1 illustrates a lateral cross-sectional view of a magnetic gear mechanism of the present invention. FIG. 2 illustrates a cross section taken along a line A-A at a center of a magnetically coupled portion of the magnetic gear mechanism illustrated in FIG. 1.

First of all, a configuration will be described mainly with reference to FIG. 1. A housing configured to hold a rotor of a magnetic bearing mechanism includes a rear bracket 31, a housing 32, and a front bracket 33.

A shaft 21 projecting leftward in the drawing is a shaft of a low-speed side rotor. The shaft 21 is configured to be cantilevered by bearings 24a, 24b arranged in the front bracket. However, an axial run-out is considered by securing a certain center distance between the bearings 24a and 24b. The material of the low-speed side rotor is a non-magnetic metal, which includes non-magnetic stainless, brass, copper, titanium, aluminum, and the like. It is for preventing a leaked magnetic flux generated by a multipole magnet from flowing through a rotor shaft.

The low-speed side rotor shaft 21 has an outer-rotor type rotor structure, and a rotor iron core 22 is held on the inside of the cup-shaped rotor. The rotor iron core is configured to include holes that allow insertion of magnets in the vicinity of a gap surface thereof, and magnets 23 are arranged in the holes.

At this time, the rotor iron core is formed of an electromagnetic steel plate, or a soft magnetic member such as powder magnetic core, amorphous, or permendur. A plurality of the magnets are arranged in the circumferential direction, and are arranged so that directions of poles face inward (radially inward toward an axial center) and outward (radially outward away from the axial center) alternately among the adjacent magnets. The surface shape of the rotor having the soft magnetic core iron core is configured to have the least thickness but having a sufficient thickness to maintain the strength of the rotor at a circumferential portion of the holes to which the magnets are inserted. This is for the purpose of minimizing magnetic flux swap between the adjacent magnets having different poles. The number of poles of the low-speed side rotor of this example is 34 (17 poles pairs).

A shaft 11 on the right side of the drawing is a shaft for a high-speed side rotor. The shaft 11 has a structure to be supported at both ends by the bearings 14a, 14b. An iron core 12 formed of an electromagnetic steel plate or a soft magnetic member such as powder magnetic core, amorphous, and permendur is fixed at a center of the shaft supported by the bearings, and the soft magnetic member includes the holes that allow insertion of the magnets in the vicinity of the surface of the rotor iron core thereof, and magnets 13 are arranged in the holes. A plurality of the magnets are arranged in the circumferential direction, and are arranged so that directions of poles face inward and outward alternately among the adjacent magnets. The surface shape of the rotor having the soft magnetic member iron core is configured to have the least thickness but having a sufficient thickness to maintain the strength of the rotor at a circumferential portion of the holes to which the magnets are inserted. This is for the purpose of minimizing magnetic flux swap between the adjacent magnets having different poles. The number of poles of the high-speed side rotor of this example is 14 (7 poles pairs).

A pole shoe for modulating the magnetic flux is arranged between the high-speed side rotor and the low-speed side rotor. In this example, 24 magnetic poles are arranged at regular pitches in the circumferential direction. The material of the pole shoe 1 is configured by an electromagnetic steel plate, or a soft magnetic member such as powder magnetic core, amorphous, or permendur for allowing the passage of the magnetic flux. However, in the case of the electromagnetic steel plate, for example, thin plates are laminated in the axial direction for the purpose of preventing an eddy current caused by the magnetic flux. Also, it is necessary to conform the length of a pole shoe 1 to an axial length of the magnetic poles of the high-speed side rotor and the low-speed side rotor or make the same shorter as illustrated in FIG. 1. It is for the purpose of preventing the magnetic flux of the magnets from spreading in the axial direction and hence being reduced in gap flux density.

Also, it is because the magnetic flux acts in the axial direction in the pole shoe prepared by laminating the electromagnetic steel plate in the axial direction, so that an eddy current is generated in the direction of the surfaces of the plates of the soft magnetic material, and a loss (heat) is generated. Therefore, it is necessary to have the same axial length of the magnetic pole of the rotor in order to swap the magnetic pole without spreading in the axial direction. It is necessary to arrange twenty-four of the pole shoes at regular pitches in the circumferential direction, and form portions between the pole shoes of a non-magnetic and non-conductive material. In this example, the peripheries of the pole shoes and between the pole shoes are formed of a high-strength resin material or ceramics, and the pole shoes are wrapped in a member 2 thereof. Since the smaller gap dimension with respect to the rotor is more preferable, it is necessary to form a surface opposing the gap to be very thin.

A pole shoe body in which the pole shoes are wrapped is fixed to a pole shoe holding base 3 configured to hold the pole shoe members, and the pole shoe holding base 3 is configured to be supported by bearings 4a, 4b so as to be rotatable with respect to the rear side bracket 31. It is for the purpose of varying a gear ratio (speed ratio) for transmitting a rotational torque by rotating the pole shoe members. The gear ratio (speed ratio) of this magnetic gear is determined by the ratio between the pole logarithms of the high-speed side rotor and the low-speed side rotor. In this example, since the pole logarithm on the high-speed side is 7, and the pole logarithm on the low-speed side is 17, 2.43 obtained by dividing 17 by 7 becomes a gear ratio (speed ratio).

Since this gear ratio is a gear ratio when the pole shoe members are standstill, the relative speed between the pole shoe members on the high-speed side, and the pole shoe members on the low-speed side varies by the rotation of the pole shoe members, so that the gear ratio can be varied continuously. Accordingly, this example employs a structure in which a gear mechanism 37 is mounted on an outer peripheral portion of the pole shoe holding base 3 to which the pole shoe members are fixed to allow the pole shoe holding base 3 to rotate with respect to the rear side bracket 31 via a pinion gear arranged at a distal end of an output shaft of a motor 35 fixed to the rear side bracket 31.

Figure 3:
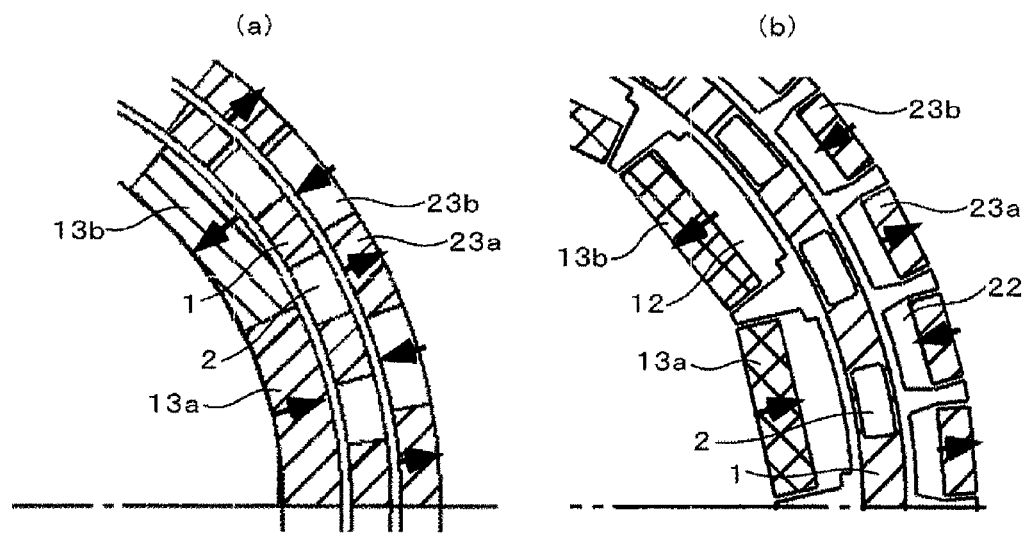
FIG. 3 is an explanatory axial cross-sectional view illustrating states of arrangement of the magnets of the magnetic gear mechanism according to the first example of the present invention, in which (a) illustrates a surface magnet structure of the related art, and (b) illustrates an embedded type magnet structure of the present invention.

FIG. 3 illustrates a variety of magnet holding shapes and an example of a pole shoe configuration. In FIG. 3(a), a general structure of a magnetic gear of the related art is illustrated. The magnets at the magnetically coupling portion have a structure of exposing the magnets on the surface of the rotor. Therefore, harmonic magnetic fluxes flow into the interior from the surfaces of the magnets, and generate an eddy current loss (heat) in the interiors of the magnets. The eddy current flows in the direction interfering with the magnetic flux, and hence cancels an effective magnetic flux and lowers the efficiency.

FIG. 3(b) illustrates a magnet arrangement structure of this example. Since the magnets are configured to be embedded in the interior of the soft magnetic material, it is referred to as an embedded magnet type. In this structure, since the surfaces of the magnets are not exposed to a gap surface facing the pole shoes, the harmonic magnetic fluxes generated in the gap surface are received by pole shoe surfaces of the soft magnetic material.

Since the iron core of the soft magnetic material has a configuration of being laminated in the axial direction as regards the electromagnetic steel plates and the amorphous as described above, the eddy current loss can hardly occur with respect to the harmonic magnetic flux as well. In the case of configuring the iron core with powder magnetic core or the like, the eddy current loss with respect to a harmonic magnetic flux can be reduced to almost zero. The structures of the pole shoes illustrated in FIG. 3($a$) and FIG. 3($b$) are different. In FIG. 3($a$), the pole shoes are arranged at regular intervals, and portions therebetween are formed of a non-magnetic and non-conductive material.

FIG. 3($b$) illustrates a shape which can be manufactured entirely by one time pressing considering manufacturing from an iron plate such as an electromagnetic steel plate. Manufacturing is facilitated by providing thin bridges and punching portions other than those becoming the pole shoes as voids. It is considered that the bridges can be brought into a state equivalent to the voids by being saturated, but the bridge is preferably formed as thin as possible so as to reduce the magnetic flux until the saturation is achieved. In the case of the electromagnetic steel plate having a thickness of 0.35 mm, a configuration of being thinned to a thickness on the order of 0.3 mm, which is approximately 70% the thickness thereof, may be presented as a characteristic of this example.

Figure 4:
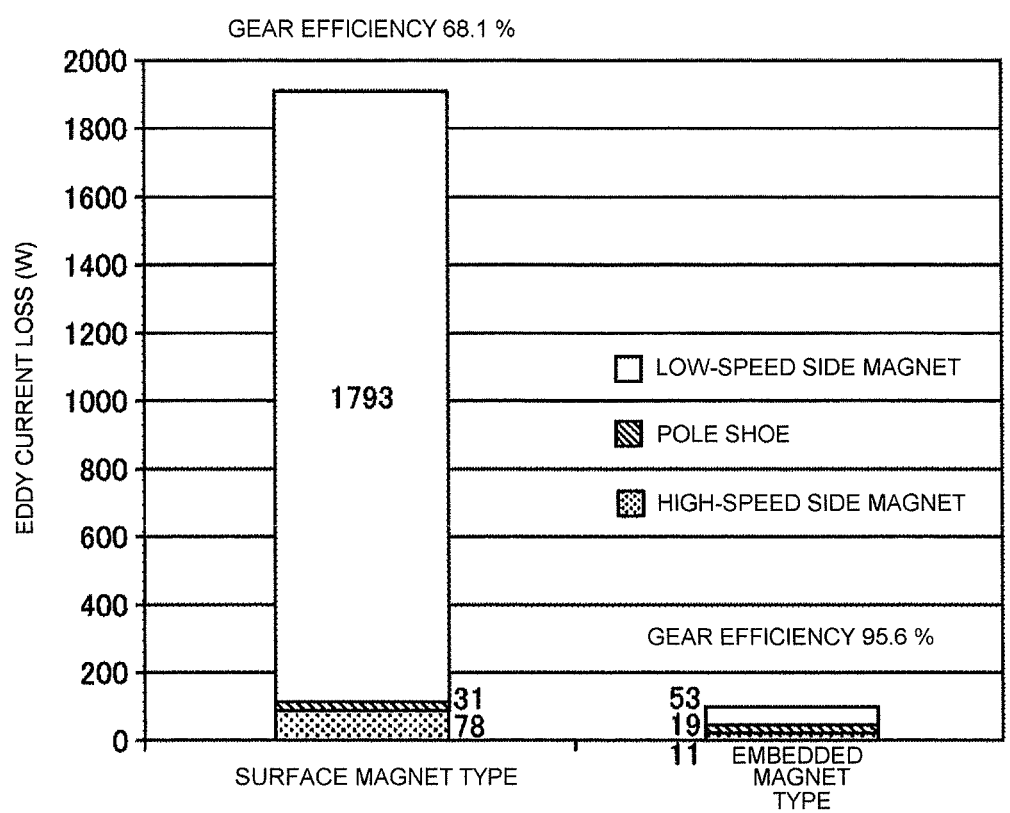
FIG. 4 illustrates a comparison of results of calculation of eddy current losses of pole shoe portions between the embedded type magnet structure as the first example of the present invention and a magnet having the structure of the related art.

FIG. 4 illustrates a result of calculation of the eddy current loss in the configuration illustrated in FIG. 3 by using FEA (Finite Element Analysis). The rated number of revolutions of an AC servo motor used in industry is 3000 r/min. in mainstream. Therefore, the calculation was performed by defining the number of revolutions on the output side (low-speed side) to be 3000 r/min. FIG. 3 illustrates a result of calculation of the eddy current loss when rotated at a phase relationship that the greatest torque is transmitted at 3000 r/min on the low-speed side. The material of the magnet was sintered rare-earth magnet of NdFeB. A residual magnetic flux density of the magnet was 1.25 T, and a specific resistance was 14.4 μΩm. At this time, with the configuration illustrated in FIG. 3($a$), the loss obtained by adding the losses of the magnets and the pole shoes was 1901 W, so that gear efficiency was lowered to 68%. The embedded type magnetic structure of this example, that is, with the structure illustrated in FIG. 3($b$), the loss obtained by adding the losses of the magnets and the pole shoes was as low as 83 w, so that a gear efficiency as high as 96% was obtained. In this manner, by restraining the eddy current loss of the interiors of the magnets and the pole shoe portions, a magnetic gear mechanism (magnetic gear) capable of transmitting a torque at an extremely high efficiency may be realized.

EXAMPLE 2

Subsequently, a second example of the present invention will be described with reference to FIG. 5.

By the result of calculation of the surface magnet type eddy current loss illustrated in FIG. 4 of the first example, it is understood that the loss on the low-speed side is significantly larger than the loss on the high-speed side. Here, the surface magnet type means that the magnets are molded in the surface of the rotor. Therefore, it is understood that a great effect is achieved in reduction of the eddy current loss by employing the embedded structure only for the rotor on the high-speed side subject to greater loss instead of employing the embedded structure for both of the rotors. FIG. 5 illustrates an example in which the surface magnet type is employed for the magnets on the high-speed side, and the embedded structure is employed for the magnets on the high-speed side. The result of calculation of the eddy current loss in this structure is illustrated in FIG. 5($b$). It is understood that the loss on the high-speed side is reduced more than a case where the surface magnet type is employed for the both, and the loss on the low-speed side can be reduced significantly. In this manner, only by employing the embedded magnet structure for at least one of the rotors, a gear with sufficiently high efficiency may be obtained.

EXAMPLE 3

Figure 6:
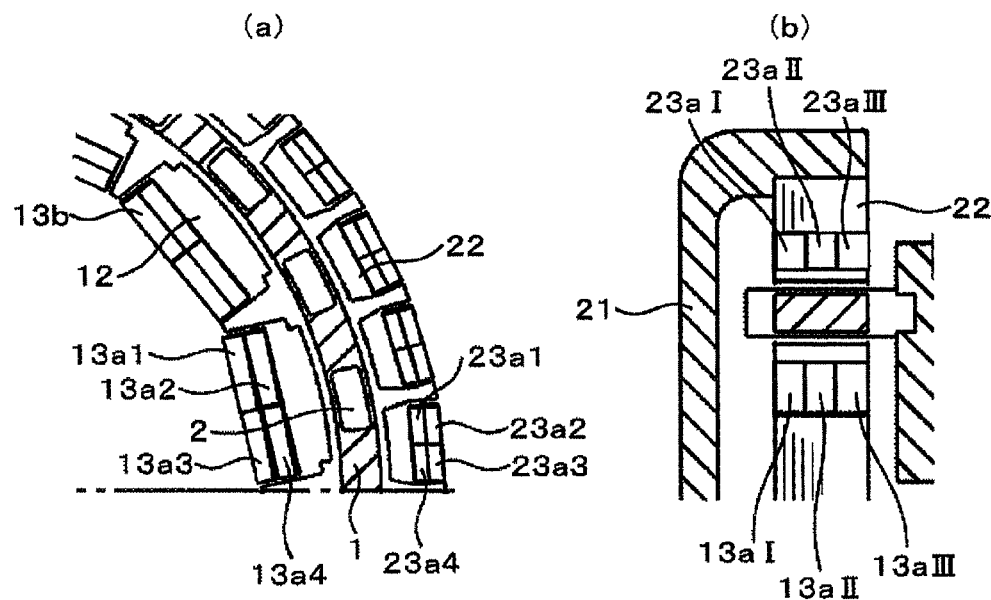
FIG. 6 illustrates an example of a state of holding magnets of the magnetic gear mechanism according to a third example of the present invention and illustrates an example of configuration in which the magnets are divided in a slot in which the magnets are embedded, and a structure in which division is also made in an axial direction.

Subsequently, a third example of the present invention will be described with reference to FIG. 6.

Figure 5:
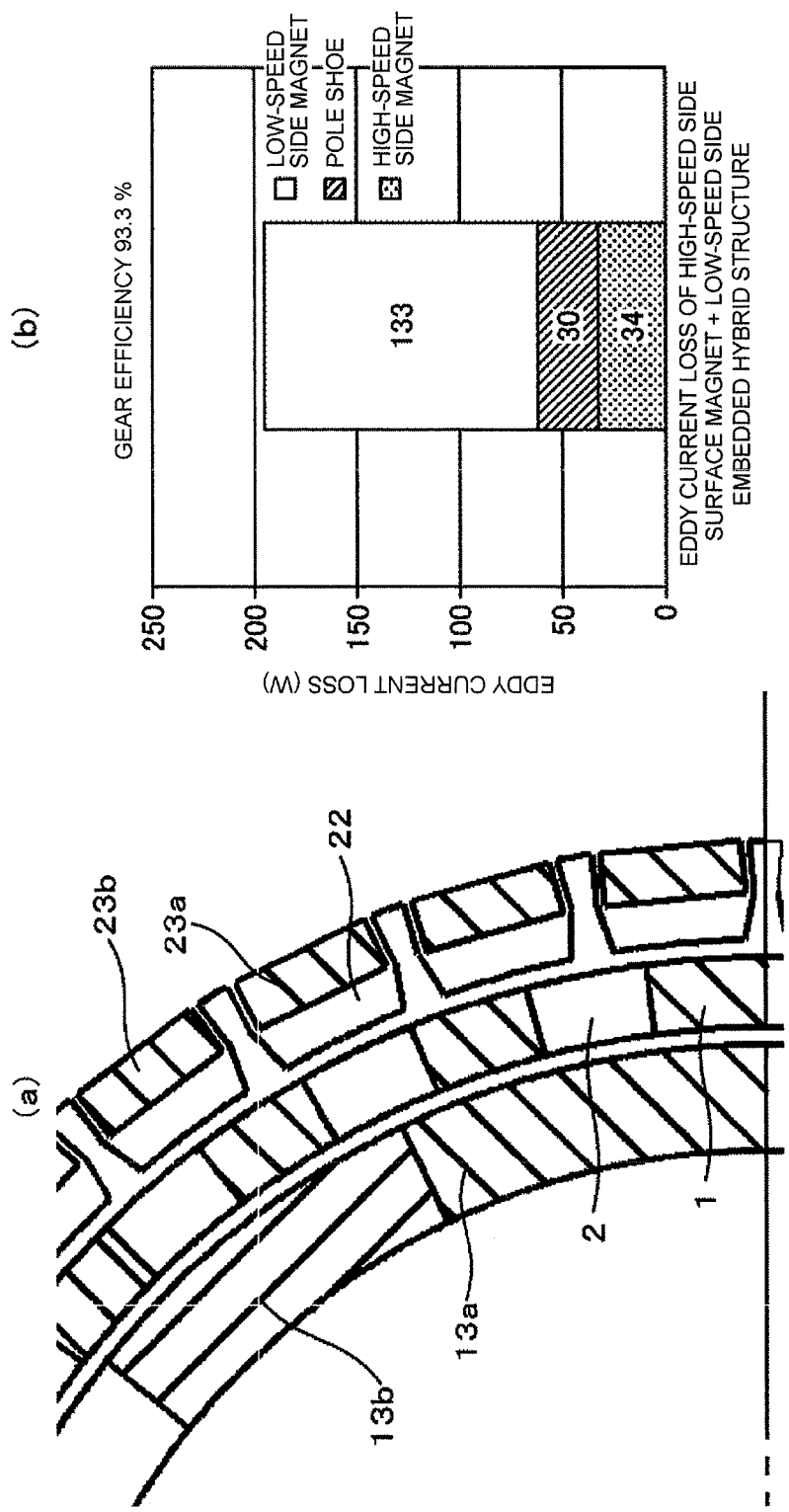
FIG. 5 illustrates a structure in a state of holding magnets of the magnetic gear mechanism according to a second example of the present invention in which the embedded structure is employed only on a multipole side, and a result of calculation of losses at that time.

According to the result of calculation of the eddy current loss illustrated in FIG. 4 and FIG. 5, the eddy current loss on the low-speed side (multipole side) cannot be reduced to zero even though the embedded magnet type of this example is employed. This is because that the harmonic magnetic fluxes exist in the magnets. Therefore, in order to further reduce the eddy current loss, it is necessary to resist the currents from flowing in the magnets. Therefore, the third example shows a structure in which the currents in the interiors of the magnets are branched finely by dividing the magnets so as to avoid the currents from flowing among the magnets. In FIG. 6($a$), an example in which the magnets are each divided into a plurality of pieces in the interior of a magnet insertion slot is illustrated. FIG. 6($b$) illustrates a drawing in the axial direction, and since the magnets are divided also in the axial direction, the loops of the eddy currents in the magnets may be reduced in size, so that the eddy current loss may be significantly reduced.

EXAMPLE 4

Figure 7:
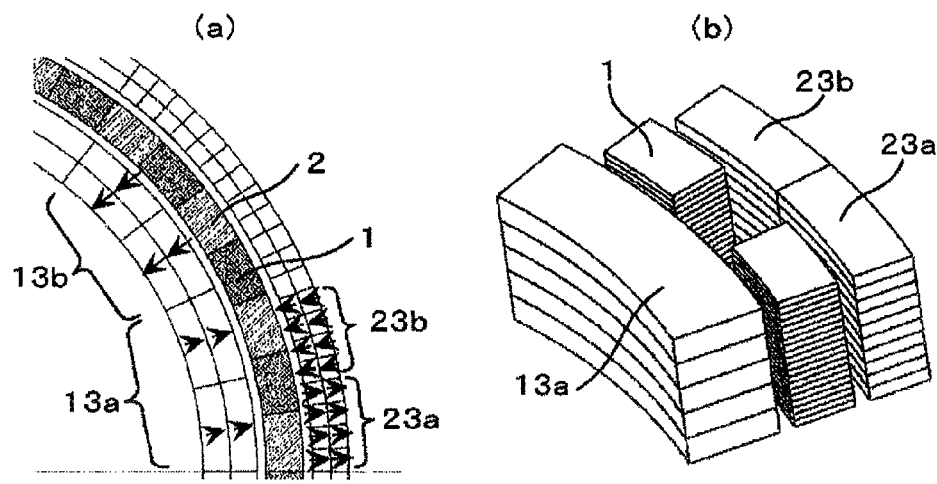
FIG. 7 illustrates an example of a state of holding magnets of the magnetic gear mechanism according to a fourth example of the present invention, which is an example in which the eddy currents are reduced by the division of the magnets when the surface magnet type is employed.

A fourth example of the present invention will be described with reference to FIG. 7.

The structure in which the magnets are divided into small pieces to resist the flow of the eddy currents is also effective in the surface magnet type. Therefore, as illustrated in FIG. 7, the rotor of the magnetic gear is configured for the purpose of preventing the eddy current from being generated by dividing the magnets in the axial direction and the circumferential direction also in the case where the surface magnet type is employed. FIG. 7 illustrates an example. As described above, since the eddy currents on the low-speed side (multipole) side are increased, it is necessary to make a division of the low-speed side rotor finer than a division of the high-speed side rotor.

EXAMPLE 5

A fifth example of the present invention will be described with reference to FIG. 8.

Figure 8:
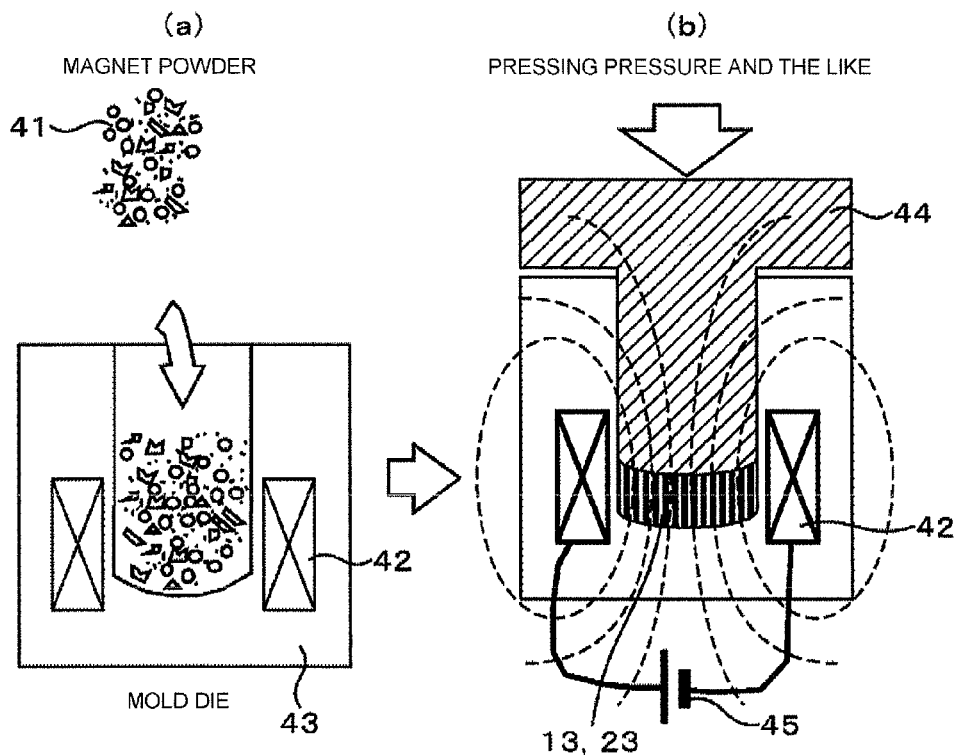
FIG. 8 illustrates an example of a structure in which the magnets are fined down to particles and are assembled as an ultimate example of a magnet dividing structure according to a fifth example of the present invention.

FIG. 8 illustrates an example in which the rotor magnet is divided ultimately on an extension of the division described above. A method of fining down the magnets to a powder state and molding is employed. In this method, since the magnets can form the eddy current loops only within the size of their own particles, the eddy current can be reduced to almost Zero. Molding of the magnet is performed by using a metal mold which allows magnetic field orientation. An adequate amount of magnetic powder material 41 fined down to a size of several tens μm is prepared, is filled in a metal mold (die) 43, and is molded by using means such as compression molding by applying a pressure to a metal mold (purch) 44. At this time, the direction of easy magnetization of the magnets maybe oriented so as to match the direction of magnetic field generated by passing a current with high degree of accuracy by performing molding while energizing a coil 42 for magnetic field orientation arranged in the metal mold 43.

A magnetic gear causing little eddy current may be manufactured by assembling the magnets 13 or 23 prepared in this manner into the rotor.

High densities of magnetic flux is obtained irrespective of whether the material of the magnets to be used for the compression molding is powder of NdFeB magnet or powder of SmFeN. SmFeN is of higher electric resistance than NdFeB, and hence is more effective for reducing the eddy current and has superior effects such that the effect of reduction of the eddy current may be obtained even though powder having a larger particle size is used when molding.

Figure 9:
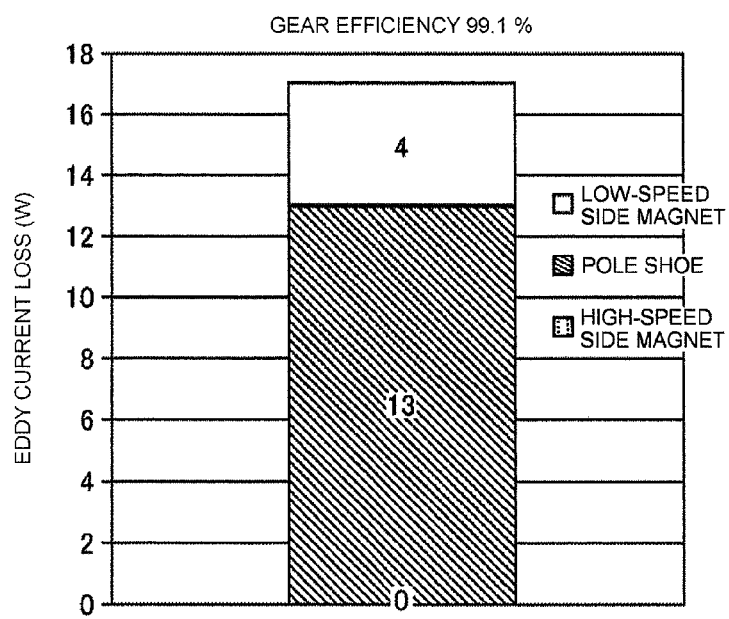
FIG. 9 illustrates a result of calculation of losses in which the magnets are fined down to particles and are assembled according to the fifth example of the present invention.

FIG. 9 illustrates a result of calculation of losses generated in the magnet having a shape illustrated in FIG. 3(*a*) when a value of 350 μΩm, which is a result of measurement of specific resistance of the magnet molded by using powder of NdFeB, is used. As conditions of calculation, a case of a phase relationship that the greatest torque is transmitted at a number of revolutions of 3000 r/min on the low-speed side is assumed. Consequently, the eddy current loss generated in the magnets on the high-speed side was almost zero, and was as low as 4W on the low-speed side (multipole side). The gear efficiency at this time was 99.1%, which was a state generating little loss at the gear portion.

The magnets manufactured in the method as described above (bonded magnets) have problems of being heat-sensitive and relatively weak in magnetism. Unlike the motor, a magnetic gear structure (magnetic gear) as one of torque transmission mechanisms as in the examples described above is mainly intended to transmit a torque efficiently, and hence does not require as strong magnetism as the motor. Therefore, by using the magnets manufactured in the method described above, maximum advantage of such magnets may be taken. Unlike the mechanical gear structure, the magnetic gears as described in the examples described above are not subject to mechanical contact and have less heat-generating properties, and hence are available to the bonded magnets.

INDUSTRIAL APPLICABILITY

The magnetic gear mechanism according to these examples maybe applied to wide range of application having a mechanism configured to generate power by using a motor or a power engine, and transmit the generated power at a decreased or increased speed, such as household appliances, industries, automotive vehicles, railways, and robots. Also, application to power transmitting mechanisms which are connected to a power generator configured to convert kinetic energy such as wind power, hydraulic power, atomic power, and fire power to electricity.

REFERENCE SIGNS LIST 1 pole shoe
2 non-magnetic member
3 pole shoe holding base
4*a*, 4*b*, 14*a*, 14*b*, 24*a*, 24*b* bearing
11 shaft
12 iron core
13, 23 magnet
21 shaft of low-speed side rotor
22 rotor iron core
31 rear bracket
32 housing
33 front bracket
34 bearing holding plate
35 pole shoes driving motor
36 pinion gear
37 spur gear
41 magnet powder
42 orientation control coil
43 metal mold (die)
44 metal mold (punch)
45 power source

The invention claimed is:

1. A magnetic gear mechanism comprising two rotors each including permanent magnets having a plurality of poles; and pole shoe members formed of a first soft magnetic material, having a plurality of poles, and arranged between the rotors, wherein rotation is transmitted by modulating magnetic fluxes having respective ratios of magnet pole numbers by pole shoe members thereof, wherein
   the rotors each are formed of a laminated member of a second soft magnetic material, and include the permanent magnets arranged in an interior of the second soft magnetic material,
   a number of divisions of the magnets is differentiated between magnets in a first rotor of the two rotors having a larger number of poles and magnets in a second rotor of the two rotors having a smaller number of poles, and the number of divisions of the magnets in the first rotor having the larger number of poles is larger, and
   the permanent magnets in the first rotor having the larger number of poles are arranged so as not to be exposed to a surface of the first rotor facing the pole shoe members that modulate the magnetic fluxes, wherein a portion of the second soft magnetic material is disposed between the permanent magnets and the surface of the first rotor facing the pole shoe members, and are divided into a plurality of pieces in the axial direction.

2. The magnetic gear mechanism according to claim 1, wherein
   the pole shoes include laminated electromagnetic steel plates and have a shape formed by being integrated in the circumferential direction with voids between the pole shoes by hollowing out as holes.

* * * * *